Nov. 7, 1967  L. O. LUNDIN ETAL  3,351,149
STEERING DEVICE FOR TRACK-LAYING VEHICLES
Filed Aug. 18, 1965  5 Sheets-Sheet 1

INVENTORS
LARS OLOF LUNDIN
NILS OLOV JOHANSSON
CLAES RUNE SVANSTRÖM
PER OLLE LENNART GUSTAFSSON
BY: Hane and Nylink
ATTORNEYS

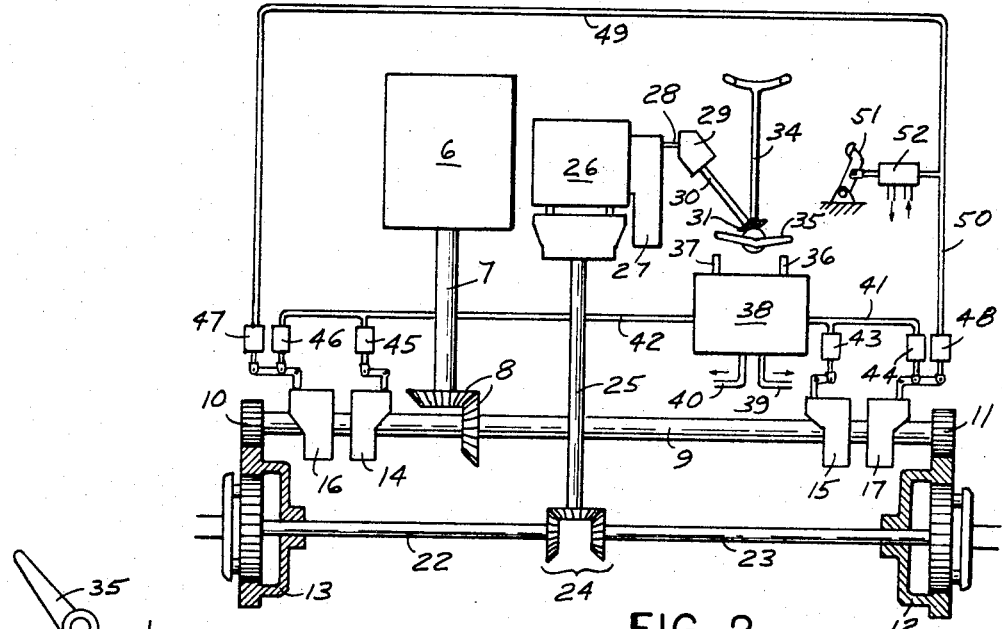
FIG. 2
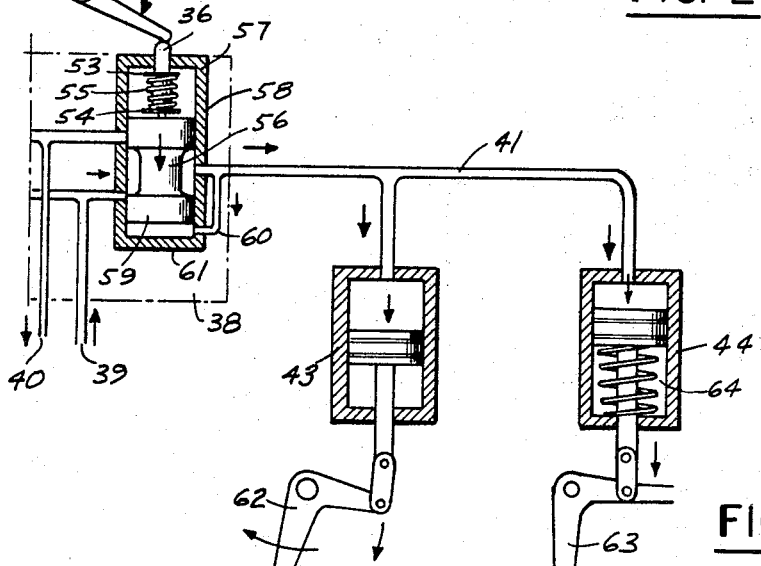
FIG. 3
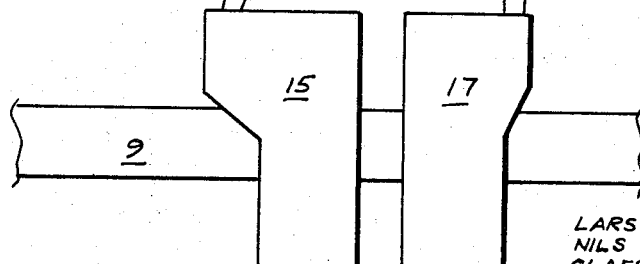
INVENTORS
LARS OLOF LUNDIN
NILS OLOV JOHANSSON
CLAES RUNE SVANSTRÖM
PER OLLE LENNART GUSTAFSSON

United States Patent Office 3,351,149
Patented Nov. 7, 1967

3,351,149
STEERING DEVICE FOR TRACK-LAYING VEHICLES
Lars Olof Lundin, Nils Olov Johansson, Claes Rune Svanström, and Per Olle Lennart Gustafsson, Karlskoga, Sweden, assignors to Aktiebolaget Bofors, Bofors, Sweden, a corporation of Sweden
Filed Aug. 18, 1965, Ser. No. 480,661
Claims priority, application Sweden, Aug. 24, 1964, 10,171/64
10 Claims. (Cl. 180—6.7)

ABSTRACT OF THE DISCLOSURE

A steering device for a track-laying vehicle, particularly a combat vehicle, the gun of which is traversed by turning the entire vehicle. The steering device permits precision traversing and also sudden and wide changes in the course of the vehicle, for instance, to take evasive action by operating a single control system. The control system includes a member which when moved a predetermined first distance out of a neutral position will effect traversing of the vehicle with a high degree of precision, but when moved beyond such first distance in reference to the neutral position will effect a rapid and wide change in the course of the vehicle.

---

The present invention relates to a steering device for steering a track-laying vehicle having two tracks, particularly for steering a vehicle of this kind designed to travel at a high speed.

The invention is particularly advantageous for use on combat vehicles, such as weapon carriers or armored tanks, the guns or missile launching devices of which must be partly or completely aimed in traverse by turning the entire vehicle, and also for use on vehicle which may be required to make wide and rapid changes in the direction of travel. The standard arrangement for track-laying vehicles of the kind above referred to is to provide for each of the two tracks of the vehicle a driving gear or wheel driven by a suitable motor and to steer the vehicle by driving one or the other of the tracks depending upon the direction into which the vehicle is to be turned. Steering of the vehicle in this manner is rather crude; it may be adequate if the vehicle is used to mount earth-moving equipment, but it is not sufficiently accurate when the weapon is used as a combat vehicle which is aimed in the traverse by turning the entire vehicle.

Co-pending application Ser. No. 452,733, filed May 3, 1965, of the assignee of the applicants herein describes a steering device which provides a highly accurate, reliable and comparatively simple steering device for a track-laying vehicle. Broadly, the device according to the aforesaid prior invention provides an auxiliary driving means which overrides the driving gears or wheels by applying a controllable additive or subtractive driving force to the main driving force applied to the tracks by the driving wheels or gears, thereby causing a turning of the vehicle into the desired direction and through a desired, accurately controllable angle.

As it is evident, the velocity with which a track-laying vehicle can be turned is limited by the friction between the tracks thereof and the ground upon which the tracks travel. In other words, the tracks will begin to slip when the velocity of the turning of the vehicle exceeds a maximum value which, of course, will vary with changes in the frictional grip of the tracks with the ground.

Tests have shown that the steering device as disclosed in the aforesaid prior invention, while being highly accurate, does not produce a turning velocity which fully utilizes the velocity acceptable by the grip of the tracks.

As it is evident, a capability of very rapidly turning of the vehicle may be of crucial importance for a combat vehicle to meet a sudden change in the tactical situation in which the vehicle may be involved.

A second co-pending application, Ser. No. 473,635, filed July 21, 1965, of applicants' assignee discloses a steering device for a track-laying vehicle of the general kind above referred to which combines the accuracy of the steering device according to the first mentioned prior invention with a capability of making very rapid and wide turns.

The steering device of the second co-pending application provides a clutch means interposed between each track of the vehicle and the main drive means for the vehicle and also a brake means interposed between each clutch means and the respective track. As it is readily apparent, suitable manipulation of the clutches and the brakes, such as strongly braking the main driving force acting upon one of the tracks while leaving unchanged the main driving force acting upnon other tracks, will cause a rapid but coarsely controlled turning of the vehicle into the desired direction. The aiming of the vehicle in the new direction is then completed by means of the precision steering device disclosed in the aforementioned first co-pending application.

The disadvantage of operating a vehicle by means of the aforedescribed steering device is that the driver of the vehicle must operate two different control systems, one for rapid turning and the other for precision turning. Furthermore, the control system for rapid turning requires operation of two control elements, one for controlling the clutches and the other for controlling the brakes.

As it is evident, any control functions to be performed on a combat vehicle should be as simple as possible and should require a minimum of time. For instance, it may be necessary to change rapidly from precision aiming in traverse to a wide change in the course of the vehicle to avoid enemy action or an obstacle on the road.

It is a broad object of the present invention to provide a novel and improved steering device of the general kind above referred to for a track-laying vehicle, particularly a combat vehicle, which permits precision traversing and also sudden and wide changes in the course of the vehicle by operating a single set of control means.

A more specific object of the invention is to provide a novel and improved steering device of the general kind above referred to, the single control means of which, when moved a predetermined first distance out of a neutral position will effect traversing of the vehicle with a high degree of precision, but when moved beyond said first distance in reference to the neutral position will effect a rapid and wide change in the course of the vehicle.

The aforementioned objects, features and advantages and other objects, features and advantages which will be pointed out hereinafter are attained by providing a steering device for a track-laying vehicle, which device comprises a main drive drivingly coupled with both tracks of the vehicle for driving the same with a uniform main driving force, a precision turn control means including an auxiliary drive coacting with the main drive for superimposing to the main driving force an additive driving force at one track and a subtractive driving force at the other track to effect turning of the vehicle into a selected direction, a rapid turn control means including a clutch interposed between each track of the vehicle and the main drive and a brake interposed between each clutch and the respective track, and a common control means for controlling both the precision turn control means and the rapid turn control means. The common control means is so arranged that when a control member thereof is displaced through a first predetermined distance in reference to a neutral position, the auxiliary drive only will be affected in the desired manner. However, if the control member is displaced beyond said first distance in reference to the neutral position, first the steering clutches and then the steering brakes are controlled whereby the auxiliary force applied to the main driving force may be retained unchanged at the value for which it is set. There is no definite limit for displacement of the control member beyond the aforementioned initial distance. The further the control member is displaced, the stronger is the braking action. The steering clutches and the steering brakes may be operated by a hydraulic system.

In the accompanying drawing, several preferred embodiments of the invention are shown by way of illustration and not by way of limitation.

In the drawing:

FIG. 2 is a schematic view of the steering system;

FIG. 3 is a detail view of part of the steering system on an enlarged scale;

Figure 1:
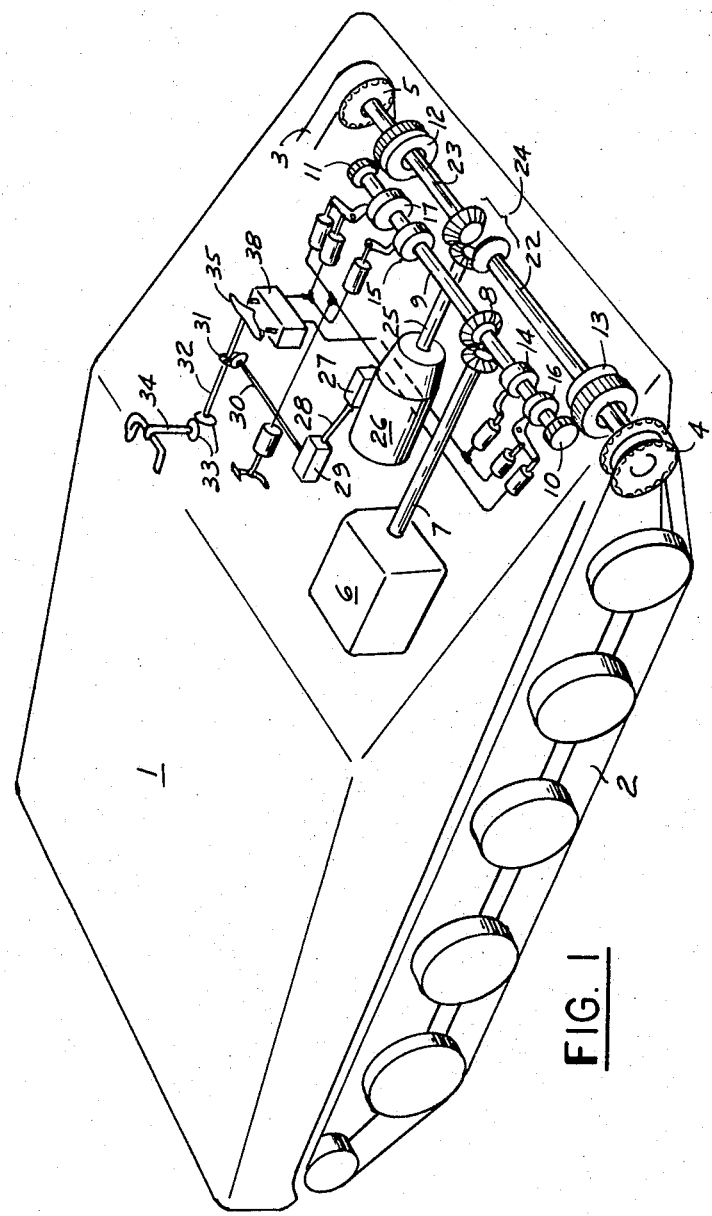
FIG. 1 is a perspective diagrammatic view of a track-laying vehicle equipped with a steering system according to the invention.

Referring first to FIGS. 1 and 2 in detail, the track-laying vehicle, and more specifically, the chassis 1 thereof, is shown only to the extent that is necessary for the understanding of the invention. The vehicle is driven in a conventional manner by track chains 2 and 3 which, in turn, are driven by driving gears or wheels 4 and 5. The driving force for wheels 4 and 5 is derived from a suitable engine, such as a diesel or gasoline internal combustion engine (not shown) via a gear box 6, a shaft 7, bevel gears 8 and a shaft 9. Shaft 9 mounts at its ends gears 10 and 11 which are in mesh with gears 13 and 12 respectively. The latter gears are only diagrammatically shown and may be visualized as being planetary gears of suitable and conventional design. Each of the two gears 13 and 12 is drivingly coupled to driving wheels 4 and 5 respectively. An auxiliary or controlling driving force is supplied to gears 12 and 13 via shafts 23 and 22. Both shafts are drivingly coupled by bevel gears 24 to a common shaft 25. This shaft, in turn, is connected to an auxiliary driving means shown as a hydraulic or hydrostatic driving means including a motor part 26 and a fluid control part 27 which via a link 28, a transmission 29 and a shaft 30 is connected to bevel gears 31 which, in turn, via a shaft 32 and bevel gears 33, are controllable by a control member 34. Shaft 32 supports a two-arm lever 35 fixedly secured to the shaft for pivotal movement in unison therewith.

The action of the auxiliary driving force applied to gears 12 and 13 is more fully described in aforementioned first co-pending application Ser. No. 452,733 of May 3, 1965.

Lever 35 coacts with two lengthwise displaceable control pins or elements 36 and 37 of valve assemblies 38 which will be more fully described hereinafter. Pins 36 and 37 are disposed in spatial positions in reference to control lever 35 such that either arm of this lever can coact with pin 36 or 37 only when the lever is tilted by means of control member 34 through a predetermined angle in reference to a neutral position of control member 34 and control lever 35. The neutral position is presumed to be the one shown in FIG. 2, that is, a position in which member 34 is in an up and down position.

Valve assemblies 38 are connected with a hydraulic pressure supply system (not shown) via an inlet pipe 39 and an outlet pipe 40. The valve assemblies 38 control pipes 41 and 42 which, in turn, are connected to servo-systems including cylinders and pistons 43, 44 and 45, 46. Piston 43 controls the setting of a clutch 15 included in shaft 9 for gear 11 and piston 44 controls the setting of a brake 17 included in shaft 9 between clutch 15 and gear 11. Similarly, pistons 45 and 46 control a clutch 14 and a brake 16 respectively. The clutches and brakes should be visualized to be of conventional design, the specific structure thereof does not constitute part of the present invention. It suffices to mention that the clutches are normally engaged and the brakes are normally released.

Brakes 16 and 17 can also be operated by hydraulic servo-systems 47 and 48 which, via pipes 49 and 50, are connected to a cylinder-piston servo-system 52, operable by means of a brake pedal 51.

To distinguish between brake servo-systems 47, 48 and brake servo-systems 44 and 46, all included in the steering system, brake systems 47 and 48 will be referred to as driving brake systems while brake systems 44 and 46 will be referred to as steering brake systems.

The arrangement of valve assemblies 38 is diagrammatically shown in FIG. 3 and its function will be explained in connection with this figure. To simplify the illustration of the valve assembly, only the valve assembly which controls the steering clutch 15 and the steering brake 17 is shown. It should be understood that the steering clutch 14 and the steering brake 16 are controlled in the same manner, one of the valve assemblies serving to effect a right turn of the vehicle and the other a left turn.

The neutral position of control lever 35 is the one shown in FIGS. 1 and 2. The lever is shown in FIG. 3 in a pivoted position in which it depresses control pin 36. This pin is comprised of two parts 53 and 54 which are lengthwise displaceable in reference to each other and are oppositely biased by a directional force, such as a coil spring 55, as will be more fully described in connection with FIG. 4. Part 54 of the pin abuts against or is secured to a plunger 56 which is slidable in a valve cylinder 57. The plunger has collars 58 and 59 defining therebetween a chamber 57a. The cylinder is connected to pressure inlet pipe 39 and to discharge or outlet pipe 40. As it is apparent from FIG. 3, plunger 58 will in certain lengthwise positions connect inlet pipe 39 to chamber 57a and close discharge pipe 40 and in other lengthwise positions cover pipe 39 and uncover pipe 40. Pipe 41 leads to the servo-systems for operating clutch 15 and brake 17 and is also connected by a branch pipe 60 to a space 61 defined in the cylinder by the respective end wall thereof and the adjacent face wall of collar 59. Accordingly, pistons 43 and 44 are subjected to pressure via pipe 41 when plunger 56 is in a position in which pipe 39 communicates with chamber 57a and the pistons are relieved of pressure when chamber 57a communicates with pipe 40. Cylinder 44a in which piston 44 for brake 17 is slidable, is biased by a spring 64 into a direction opposite to the direction of the pressure of the fluid fed through pipe 41.

Piston 43 is coupled by a suitable linkage 62 to clutch 15 and piston 44 is similarly coupled by a suitable linkage 63 to brake 17. The operation of a clutch or a brake by a linkage is well understood in the art and is hence not described in detail or illustrated. It suffices to state that displacement of piston 43 in the direction of the arrow will gradually release the clutch and displacement of piston 44 in the direction of the arrow will gradually apply a braking action, the force of which is determined by the extent of the displacement of piston 44.

Figure 4:
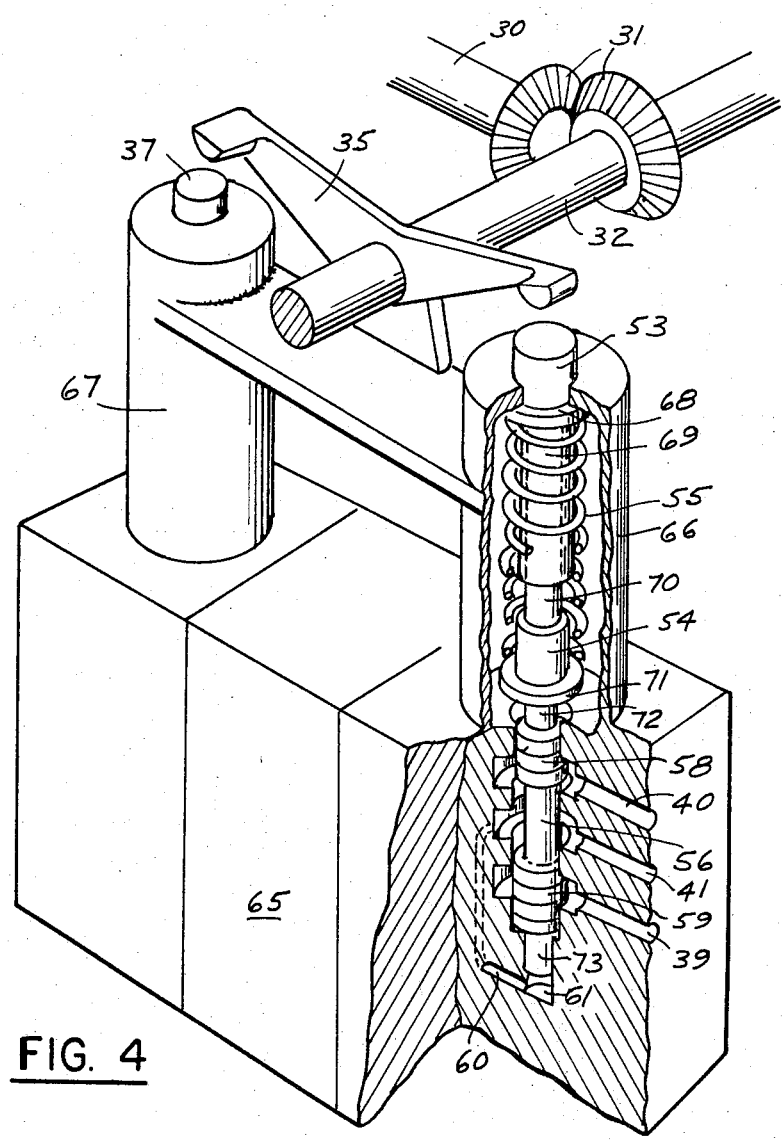
FIG. 4 is a perspective further detailed view of the part of the system shown in FIG. 3 on an enlarged scale.

Turning now to FIG. 4, this figure shows one of the valve assemblies 38 in greater detail. There is shown a valve housing 65 including two suitably dimensioned valve chambers in which the valve plungers are slidable. To simplify the illustration only one of the plungers, to wit, plunger 56 is shown. Generally cylindrical casings 66 and 67 rise from the top of valve housing 65, one for control pin 36 and the other for the second control pin 37.

The two parts 53 and 54 of control pin 36 are lengthwise displaceable in reference to each other in casing 66. Part 53 has a headed portion protruding through an opening in the top wall of casing 66. A collar 68 on part 53 abuts in the uppermost position of the part against the inner top wall of the casing. Pin part 53 has an axial bore 69 in which is slidably received an extension 70 of pin part 54 so that the two pin parts are coaxially guided. The pin part 54 has a collar 71 and a spring 65 disposed between collars 68 and 71 biases pin part 53 upwardly in reference to pin part 54. Pin part 54 has a downwardly protruding extension 72 which abuts against collar 58 of plunger 56. The plunger at its lower end has an extension 73, the end face of which defines the cylinder space 61 in conjunction with the respective wall portions of housing 65. Space 61 is connected as described in connection with FIG. 3 with pipe 41 via pipe 60 shown in FIG. 4 as a bore or conduit within housing 65.

The steering device as hereinbefore described operates as follows:

Let it be assumed that it is intended to turn the vehicle either left or right through a narrow angle with a high degree of accuracy. For this purpose, the control member 34 is pivoted, say, to the left, as seen in the forward direction of the vehicle, but only through an angle such that two-armed control lever 35 does not engage the control pin 36. In other words, the valve assembly 38 of FIG. 3 or 4 will not be operated by pivoting lever 35 within such first distance. However, the limited pivoting of control member 34 actuates fluid control part 27 via bevel gears 33, shaft 32, bevel gears 31, shaft 30, transmission 29 and link 28. The fluid control part 27, in the manner more fully described in copending patent application, Ser. No. 452,733, now operates the motor part 26 of the auxiliary driving means. As a result, shaft 25 is rotated which, via bevel gears 24 and shafts 22 and 23, rotates gears 12 and 13 which, in turn, will superimpose an additive and a subtractive driving force respectively to driving wheels or gears 4 and 5 as also fully described in co-pending application Ser. No. 452,733. Accordingly, the steering control which is obtained by pivoting control member 34 through a first angular distance such that neither of the control pins is engaged corresponds fully to the precision steering control as described in aforesaid application Ser. No. 452,733.

Let it now be assumed that a wider and rapid change in the travel direction of the vehicle is desired. Such change is initiated by pivoting control member 34 through an angle beyond the aforedescribed first angular distance so that either one of the control pins 36 and 37 is engaged by the respective arm of control lever 35 depending upon the direction into which it is desired to turn the vehicle. Assuming that it is desired to make a left turn, control pin 36 will be pressed down.

Referring now to FIG. 3, depression of pin 36 compresses spring 55 between parts 53 and 54 of pin 6. The resulting increase in spring pressure is transmitted via pin part 54 to plunger 56. The spring is so arranged that it normally biases the plunger into a position in which chamber 57a is connected with outlet pipe 40. When now the plunger is moved downwardly by the increased spring pressure as before described, the connection of chamber 57a with outlet pipe 40 is covered by plunger collar 58 and the chamber is connected with inlet pipe 39. The fluid pressure now building up in chamber 57a is extended through pipe 41 and branch pipe 60 to cylinder space 61.

When the pressure in chamber 57a and also the pressure in cylinder space 61 reach a value such that it exceeds the downward pressure exerted upon the plunger by spring 55, the plunger will be displaced upwardly against the action of spring 55, that is, toward control pin 36 which is held in a fixed position by engagement with the respective arm of control lever 35. Hence the pressure build-up in chamber 57a and thus also in pipe 41, which is connected to chamber 57a in the described operational position of the plunger, obtains a value corresponding to the distance by which pin 36 is pressed in.

The pressure in pipe 41 will act upon pistons 43 and 44. The resulting downward displacement of piston 43 will gradually release clutch 15 via linkage 62. The speed with which the clutch is released and also the extent to which it is released depend upon the extent and the speed of the downward movement of piston 43 which, in turn, depends upon the pressure in pipe 41. This pressure, in turn, depends upon the extent of the depression of pin 36 and thus upon the angle of pivoting of control member 34 through the second angular distance and the rapidity with which such pivoting is effected. Brake 17 is similarly controlled via linkage 63 by the downward movement of piston 44. However, the actuation of the brake is delayed in reference to the action of the clutch by spring 64 which counteracts the downward pressure exerted upon piston 44 by the pressure build-up in pipe 41. In other words, the brake will not become effective until the control member 34 is moved through a further distance such that the resulting further displacement of control pin 36 increases the pressure upon piston 44 sufficiently to overcome the counter pressure of spring 44.

When now the vehicle has turned as desired and the driver returns control member 34 into the neutral position, the plunger, by the action of the pressure in cylinder space 61, will be pushed upwardly and thereby return control pin 36 into its initial position. At the same time, the plunger will close inlet pipe 39 and re-open outlet or discharge pipe 40 so that the pressure in pipe 41 and thus the pressure upon pistons 43 and 44 are relieved.

It is often desirable and readily obtainable with the steering device as disclosed that the precision steering obtainable via shaft 25 previously described can be used in conjunction with coarse steering obtained by means of steering clutches 14, 15 and steering brakes 16, 17. Such cooperation requires that the steering effect initiated by shaft 25 during movement of control member 34 through its first angular distance, that is, through a distance within which lever 35 does not engage either one of control pins 36 and 37, remains unchanged and preferably at its maximum value. Such retention of the steering action initiated by shaft 25 is obtained by the transmission means as disclosed in co-pending application Ser. No. 452,733. As is readily apparent from the disclosure of this co-pending application, turning of shaft 30 controls the transmission 29 so that link 28 which, in turn, controls motor part 27 coupled to shaft 25, remains in its position of maximum displacement.

Brakes 16 and 17 can also be operated by depressing brake pedal 51 which actuates servo-system 52 so that pressure fluid is fed through pipes 49 and 50 to the driving brake systems 47 and 48 which, in turn, operate brakes 16 and 17. In other words, the driving brake system as just described constitutes in effect a conventional power brake assembly which acts uniformly upon both tracks of the vehicle.

Figure 5:
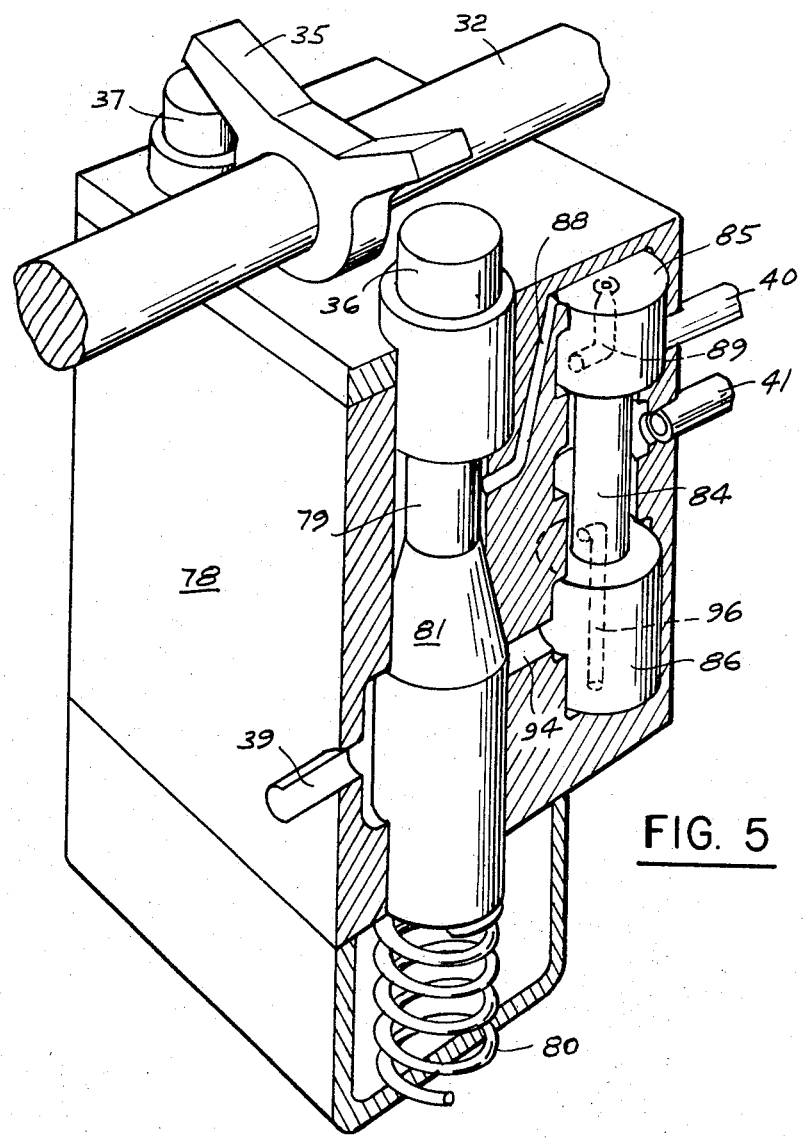
FIG. 5 is a perspective view partly in section of a modification of part of the control system of the device.
Figure 6:
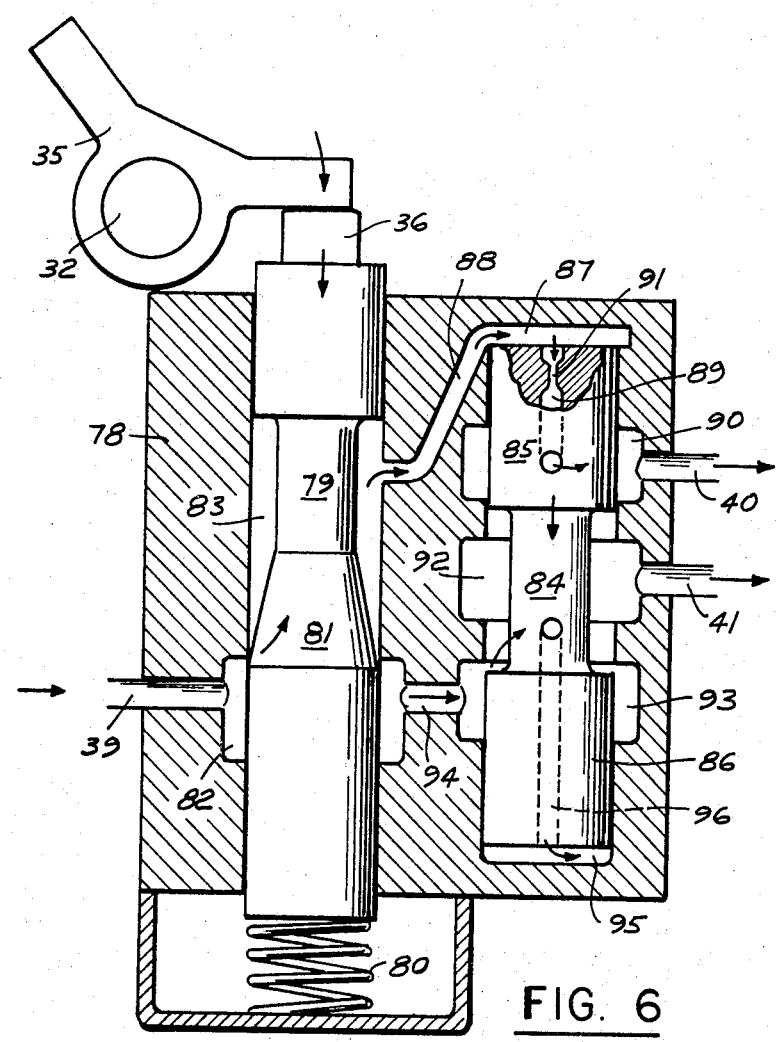
FIG. 6 is a sectional view of the control system according to FIG. 5.

FIGS. 5 and 6 show a modification of the two valve assemblies. The valve assemblies of FIGS. 5 and 6 again should be visualized as being identical, one serving to control turns to the left and the other, turns to the right. For sake of simplicity of illustration, only one of the assemblies in shown. Furthermore, in FIG. 6 the illustrated valve assembly is turned through an angle of 90 degrees in reference to its actual position with respect to the other valve assembly to permit a showing of shaft 32 and two-armed control lever 35 thereon in a clear fashion.

Control pin 36 which is operable by lever 35 as previously explained, is secured to or constitutes part of a control plunger 79 which is displaceable in a valve housing 78. A loaded coil spring 80 disposed in a casing 80a suitably secured to or integral with the bottom of valve housing 78 urges plunger 79 upwardly, that is, into the direction opposite to the one into which the plunger is displaceable by engagement with lever 35. Plunger 79 has an intermediate tapered or chamfered portion 81 to define a valve chamber 83. A second chamber 82 communicates with the pressure fluid inlet pipe 39 when plunger 79 is downwardly displaced just below the position illustrated in FIG. 6.

A second plunger 84 is slidably disposed parallel to plunger 79 in valve housing 78. Plunger 84 has at its ends collars or enlargements 85 and 86 to define a chamber 92 therebetween. In addition, a cylinder space 87 above plunger collar 85 and a cylinder space 95 below plunger collar 86 are provided. Space 87 is connected to chamber 83 by a duct 88 and it is further connected through an axial bore 89 with a chamber 90 which, in turn, communicates with discharge or outlet pipe 40. Bore 89 includes a throttled or constricted portion 91. Chamber 92 is continuously in communication with pipe 41 leading to the servo-systems including pistons 43 and 44 for control of clutch 15 and brake 17 respectively as previously described. A further chamber 93 is connected via a duct 94 with chamber 82. Finally, cylinder space 95 is connected by an axial bore 96 in plunger 84 to chamber 92.

The rims of collars 85 and 86 facing chamber 92 are so located that when plunger 84 is displaced upwardly, that is, into space 87, chambers 90 and 92 are in communication with each other and when the plunger is moved downwardly into the space 95, chambers 92 and 93 are in communication with each other.

The valve assembly as shown in FIGS. 5 and 6 operates as follows:

Let it first be assumed that a rapid and wide change of the vehicle toward the left is intended and that control member 34 (see FIGS. 1 and 2) has been turned through an angle such that control pin 36 is displaced downwardly, that is, in the direction of the upper arrows shown in FIG. 6. Accordingly, plunger 79 is pushed down and spring 80 is compressed. A gap is now opened between chambers 82 and 83 and pressure will build up in chamber 83. The extent of the pressure build-up is obviously a function of the distance through which pin 36 and with it plunger 79 are displaced downwardly, that is, of the width of the passage between chambers 82 and 83 (disregarding, of course, the magnitude of the fluid pressure in pipe 39).

The pressure in chamber 83 is transmitted through duct 88 to cylinder space 87 and from this space through axial bore 89 into chamber 90 which, in turn, is connected with outlet pipe 40. The pressure build-up in chamber 90 is controlled by the effective flow area of throttle or constriction 91 and the pressure in chamber 83. Thus, the final pressure in cylinder space 87 depends upon the downward displacement of control pin 36.

The increase in pressure in cylinder space 87 causes a downward displacement of plunger 84. As a result of the displacement of plunger 84, the respective rim of its collar 86 will open a gap between the collar and the respective seating edge of valve housing 78, thereby connecting chamber 93 to chamber 92. Hence there is now a direct flow path for the pressure fluid from inlet pipe 39 through chamber 82, duct 94, chamber 93 and chamber 92 to pipe 41, thereby causing operation of clutch 15 and brake 17 as previously described.

The pressure build-up in chamber 89 is also transmitted through bore 96 to cylinder space 95. When the pressure build-up in this space exceeds the pressure in cylinder space 87, plunger 84 will be forced upwardly. Accordingly, the flow of pressure fluid to pipe 41 is a function of the extent to which control pin 36 is depressed.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:
1. A steering device for a track-laying vehicle having two tracks, said device comprising:
a main drive means drivingly coupled with both tracks of said vehicle for driving the tracks with a uniform main driving force;
auxiliary drive means coacting with said main drive for superimposing to said main driving force an additive driving force at one track and a subtractive driving force at the other track to effect turning of the vehicle into a desired direction;
main control means for each track, each of said main control means including a clutch means interposed between the respective track and said main drive means and a brake means interposed between the respective clutch means and said main drive means;
auxiliary control means coacting with said auxiliary drive means for controlling the same; and
common control means for controlling said auxiliary control means and said main control means, said common control means being settable into a selected one of several control positions and controlling the respective main control means in one selected control position and said auxiliary control means in another selected control position, said common control means including a control member movable into two directions, movement of said control member into either direction first placing said member into a first position controlling the auxiliary control means and then into a second position controlling one of said main control means, said control member including a two-armed control lever pivotal about a stationary pivot axis and biased toward a predetermined neutral position of the common control means, each of said main control means including a displaceable control element, each of said control elements controlling the respective clutch means during a first distance of displacement of the control element and the respective brake means during a second distance of displacement, said control elements being mounted in operational positions in reference to said lever such that upon pivoting the lever in either direction of tilt through a first angle one arm thereof engages one of said control elements, upon pivoting the lever through a second angle displaces the engaged control element through said first distance and upon pivoting the lever through a third angle displaces the engaged control element through said second distance for the purposes aforesaid, and said auxiliary control means being operatively coupled with said lever for activating said control means during pivoting of the lever through said first angle in either direction of tilt.

2. A steering device according to claim 1, wherein said auxiliary control means are retained in the activated position upon completion of the pivotal movement of the lever through said first angle.

3. A steering device according to claim 1, wherein each of said main control means further comprises a hydraulic pressure means including a valve assembly, said valve assembly in a first position supplying pressure fluid to the respective clutch means to release the same and in a second position to the respective brake means for actuating the same, the valve assembly being controlled by the respective control element for movement of the respective valve assembly into said first position by displacement of said control element through said first distance and into said second position upon displacement of said control element through said second distance.

4. A steering device according to claim 3, wherein each of said valve assemblies comprises a valve cylinder closed at one end and a plunger slidable in the cylinder, said plunger having a collar at each end to define a chamber therebetween, a first conduit connected to said cylinder for feeding pressure fluid to said chamber, a second conduit connected to said chamber for discharging pressure fluid therefrom, said plunger in one position covering said first conduit and uncovering the second conduit and in another position uncovering the first conduit and covering the second conduit, a third conduit connecting said chamber in any position of the plunger with the respective clutch means and brake means to feed pressure fluid to said means for operating the same, a fourth conduit branched off said third conduit and connected to a cylinder space defined by the closed end of the cylinder and the adjacent end face of the plunger, and wherein each of said control elements comprises two aligned parts lengthwise slidable in reference to each other and a loaded spring means disposed between said parts to bias the same in opposite direction, one of said element parts abutting against the plunger and the other being engageable with the respective arm of said two-armed lever, pressure engagement of said lever arm with said other part of the control element displacing the plunger into said other one of the positions thereof and disengagement of said lever arm from said other part returning the plunger into said one position by the action of said spring means.

5. A steering device according to claim 4, wherein the loading of said spring means and the fluid pressure supplied to said cylinder chamber and to said cylinder space are so correlated that the maximal pressure build-up in said space is in excess of the spring pressure whereby the fluid pressure in the space bias the plunger toward engagement with the respective engaged control element to hold the latter in a position of displacement corresponding to the pivotal position of the control lever.

6. A steering device according to claim 1, wherein each of said main control means further comprises a hydraulic pressure means including a valve assembly, said valve assembly in a first position supplying pressure fluid to the respective clutch means to release the same and in a second position to the respective brake means for actuating the same, the valve assembly being controlled by the respective control element for movement of the respective valve assembly into said first position by displacement of said control element through said first distance and into said second position upon displacement of said control element through said second distance, and wherein each of said clutch means and each of said brake means comprises a servo-motor means including a cylinder and a piston slidable therein, the position of each of said pistons being controlled by the pressure fluid supplied to the respective cylinder, and wherein the servo-motor means of each of said brake means includes spring means counteracting the action of the pressure fluid upon the piston thereof whereby the displacement of the piston of the brake means is delayed in reference to the displacement of the piston of the clutch means upon application of pressure fluid to the servo-motor means of both the clutch means and the brake means until said control element is displaced through said second distance.

7. A steering device according to claim 1, wherein each of said main control means further comprises a hydraulic pressure means including a valve assembly, said valve assembly in a first position supplying pressure fluid to the respective clutch means to release the same and in a second position to the respective brake means for actuating the same, the valve assembly being controlled by the respective control element for movement of the respective valve assembly into said first position by displacement of said control element through said first distance and into said second position upon displacement of said control element through said second distance, and wherein each of said clutch means and each of said brake means comprises a servo-motor means including a cylinder and a piston slidable therein, the position of each of said pistons being controlled by the pressure fluid supplied to the respective cylinder, and also comprising further control means for simultaneous control of the brake means of both main control means, said further control means being connected to the servo-motor means of both brake means for supplying pressure fluid thereto upon operation of said further control means.

8. A steering device according to claim 1, wherein each of said main control means comprises a hydraulic pressure means including a valve assembly, said valve assembly comprising a valve housing including a first and a second valve chamber interconnected by ducts, a slidable plunger in each of said valve chambers, said first valve being connectable to a supply of pressure fluid and said second valve chamber being connected to the respective clutch means and brake means for feeding pressure fluid thereto and having a discharge outlet for pressure fluid, the plunger in the first valve chamber being slidable between a first position in which said plunger opens, via said interconnecting ducts, a flow passage for pressure fluid from the first chamber to the second chamber and a second position in which said flow passage is closed and the plunger in said second valve chamber being slidable between a position in which a flow passage for pressure fluid is open to said clutch means and said brake means and a second position in which flow passage is closed and a flow passage to said discharge outlet is open, the position of the plunger in said first chamber being controlled by the position of the respective control element and the position of the plunger in said second chamber being controlled by the position of the plunger in the first chamber and the flow of pressure fluid through said interconnecting ducts between said two chambers.

9. A steering device according to claim 8, wherein spring means in said first valve chamber bias the plunger therein toward engagement with said control element.

10. A steering device according to claim 8, wherein said plunger in the second valve chamber defines closed spaces in the valve housing above and below the plunger and includes bores for connecting the space above the plunger with the discharge outlet of the second chamber and the space below the plunger with the flow of pressure fluid supplied to said second chamber whereby the plunger in the second chamber is urged into a position corresponding to the position of the plunger in the first chamber.

References Cited

UNITED STATES PATENTS

| | | | |
|---|---|---|---|
| 1,797,797 | 3/1931 | Saives | 74—720.5 X |
| 2,745,503 | 5/1956 | Fisher | 180—6.7 X |
| 2,774,434 | 12/1956 | Ferris | 180—6.3 |
| 2,817,427 | 12/1957 | Clark et al. | 192—13 |
| 3,056,479 | 10/1962 | Prior | 192—13 |

BENJAMIN HERSH, *Primary Examiner.*

J. A. PEKAR, *Assistant Examiner.*